(12) United States Patent
Bruce et al.

(10) Patent No.: US 8,260,991 B2
(45) Date of Patent: Sep. 4, 2012

(54) DATA PROCESSING APPARATUS AND METHOD FOR MEASURING A VALUE OF A PREDETERMINED PROPERTY OF TRANSACTIONS

(75) Inventors: Alistair Crone Bruce, Stockport (GB); Timothy Charles Mace, Haverhill (GB)

(73) Assignee: ARM Limited, Cambridge (GB)

( * ) Notice: Subject to any disclaimer, the term of this patent is extended or adjusted under 35 U.S.C. 154(b) by 337 days.

(21) Appl. No.: 12/585,460

(22) Filed: Sep. 15, 2009

(65) Prior Publication Data

US 2011/0066780 A1 Mar. 17, 2011

(51) Int. Cl.
*G06F 13/00* (2006.01)
(52) U.S. Cl. ........ 710/110; 710/100; 710/305; 710/316; 710/317; 370/237; 702/182
(58) Field of Classification Search .................. 710/110, 710/316, 317; 370/237
See application file for complete search history.

(56) References Cited

U.S. PATENT DOCUMENTS

| | | | | |
|---|---|---|---|---|
| 5,426,736 | A * | 6/1995 | Guineau, III | 710/56 |
| 6,067,643 | A * | 5/2000 | Omtzigt | 714/47.1 |
| 6,128,712 | A * | 10/2000 | Hunt et al. | 711/158 |
| 7,020,762 | B2 * | 3/2006 | Sprangle et al. | 711/204 |
| 7,349,985 | B2 * | 3/2008 | Gilmartin et al. | 709/242 |
| 7,827,361 | B1 * | 11/2010 | Karlsson et al. | 711/147 |
| 8,032,329 | B2 * | 10/2011 | Chou et al. | 702/182 |
| 8,046,744 | B1 * | 10/2011 | Marshall et al. | 717/128 |
| 2006/0112255 | A1 * | 5/2006 | Sprangle et al. | 711/204 |
| 2011/0072178 | A1 * | 3/2011 | Mace | 710/244 |
| 2011/0225337 | A1 * | 9/2011 | Byrne et al. | 710/306 |
| 2011/0267952 | A1 * | 11/2011 | Ko et al. | 370/237 |

* cited by examiner

*Primary Examiner* — Brian Misiura
(74) *Attorney, Agent, or Firm* — Nixon & Vanderhye P.C.

(57) ABSTRACT

A data processing apparatus and method for measuring a value of a predetermined property of transactions are provided. The data processing apparatus has initiator circuitry for initiating transactions, recipient circuitry for handling each transaction initiator by the initiator circuitry, and a communication path interconnecting the initiator circuitry and the recipient circuitry via which the transactions are propagated between the initiator circuitry and the recipient circuitry. Measurement circuitry is coupled to the communication path for measuring a value of a predetermined property of the transactions, such as the latency of those transactions. The measurement circuitry has active transaction count circuitry for maintaining an indication of the number of transactions in progress, and accumulator circuitry for maintaining an accumulator value which is increased dependent on the number of transactions in progress. Further, a value register is provided for maintaining an estimate of the value of the predetermined property. Each time a transaction in progress reaches a predetermined point, for example a transaction end point, the accumulator value is decreased dependent on the estimate currently stored in the value register, and further the estimate stored in the value register is updated dependent on the accumulator value. Via this feedback mechanism, the estimate stored in the value register quickly settles to the actual value of the predetermined property being measured, and accordingly such measurement circuitry provides a simple, low cost and flexible mechanism for measuring the value of a predetermined property of transactions.

25 Claims, 6 Drawing Sheets

DATA PROCESSING APPARATUS AND METHOD FOR MEASURING A VALUE OF A PREDETERMINED PROPERTY OF TRANSACTIONS

BACKGROUND OF THE INVENTION

1. Field of the Invention

The present invention relates to a data processing apparatus and method for measuring a value of a predetermined property of transactions, an example of such a predetermined property being latency of transactions.

2. Description of the Prior Art

Transactions are used within a data processing system as a mechanism for communicating between master devices and slave devices. As an example, if a master device wishes to read data from, or write data to, a memory, the master device may initiate a transaction to be handled by a memory controller (a slave device) associated with the memory. A transaction will typically comprise an address transfer issued from the master device to the slave device, and one or more data transfers between the master device and the slave device. For a read transaction, these data transfers will pass from the slave device to the master device, whilst for a write transaction these data transfers will pass from the master device to the slave device.

A master device may be coupled directly to a slave device via a dedicated communication path. However, in modern data processing systems, it is more usual for a number of master devices and slave devices to be interconnected via interconnect circuitry. The interconnect circuitry provides a matrix of communication paths via which master devices coupled to the interconnect circuitry can communicate with slave devices coupled to the interconnect circuitry. In such embodiments, rather than there being a single dedicated communication path between a master device and a slave device, communication between a master device and a slave device can be considered to take place via a series of communication paths, where each communication path has initiator circuitry at one end and recipient circuitry at the other end. For example, starting with the master device initiating a transaction, there will be a communication path from that master device to a slave interface of the interconnect circuitry, where the master device can be viewed as the initiator circuitry and the slave interface of the interconnect can be viewed as the recipient circuitry. Similarly, there will be one or more communication paths provided through the interconnect circuitry, with each communication path having a master interface forming initiator circuitry for that communication path and a slave interface forming recipient circuitry for that communication path. It will be appreciated that a slave interface for one communication path may itself operate as a master interface for the next communication path along the route between the master device and the slave device. Finally, there will be a communication path from a master interface of the interconnect circuitry to the recipient slave device itself, and for this communication path the master interface of the interconnect circuitry will form the initiator circuitry and the slave device will form the recipient circuitry.

Given the above discussion, it will be appreciated that when considering any particular communication path within the data processing system, that communication path will interconnect initiator circuitry at one end with recipient circuitry at the other end, and the initiator circuitry can initiate transactions, with the recipient circuitry then handling each such transaction. For a communication path within the interconnect circuitry, the recipient circuitry will typically handle the transaction by performing the required routing operations to direct the relevant transfer(s) of the transaction between that communication path and the next communication path along the link between the master and the slave device. When considering the ultimate recipient slave device, the slave device will handle each transaction by performing the required read or write operations.

It is useful within data processing systems to be able to measure values of a predetermined property of the transactions handled by the data processing system. Further, it is useful to be able to measure the values of such a predetermined property at a variety of different locations with the system. For example, it may be desirable to measure the predetermined property at any one of the various communication paths discussed above. Such measurements can be useful in a variety of situations, for example when undertaking performance profiling in order to determine whether the data processing system is operating as expected. One example of a property of a transaction which may be useful to measure is latency. At any particular communication path, latency can be measured by observing the time between the initial request (typically the address transfer) issued by the initiator circuitry, and a time indicative of the end of the transaction, for example the timing of a predetermined response from the recipient circuitry. A measurement device could hence be arranged to snoop the various transfers occurring over a particular communication path in order to detect the start of a transaction and the corresponding end of a transaction, and thereby calculate the latency of the transaction.

However, many modern data processing systems use transaction protocols which allow multiple transactions to be pending at any point in time, and allow out of order responses to those transactions. In such systems, it is often the case that transaction identifiers (IDs) are used to enable the individual transfers making up a transaction to be identified, so that an address transfer at the start of a transaction can be matched up with the various data transfers of that transaction. In such situations, in order to measure latency of transactions in the manner described above, it would be necessary to perform full transaction tracking in respect of the communication path, which is very expensive in terms of both power and area. For example, such full transaction tracking could be achieved by providing a stack-based scheme, where each new transaction observed is pushed on to the stack along with an indication of a start time, and when each transaction end is observed, that transaction end is matched with the corresponding transaction start stored in the stack by matching of the transaction IDs, the relevant entry is removed from the stack, and a determination of the transaction latency is made for that transaction.

There are various problems with such an approach. Firstly, a determination needs to be made at design time as to how many pending transactions will need to be tracked, as this will determine the size of the stack provided for tracking the pending transactions. Further, such an approach is relatively complex in terms of the hardware required to support the full transaction tracking. In addition, the requirement for full tracking means that the tracking circuitry must be on all of the time, and cannot be switched on and off arbitrarily, since this could cause incorrect matching of transaction ends with transaction starts. For example, it is often the case that the transaction IDs used for transactions are not unique, and multiple pending transactions using the same ID can be present (it is typically the case that such pending transactions using the same ID have to complete in order). If tracking circuitry such as described above were turned on at some arbitrary point, it will be appreciated that the tracking circuitry would not operate reliably, and incorrect latency measurements could be taken.

Accordingly, it would be desirable to provide an improved technique for measuring values of a predetermined property of transactions, which is less complex and more flexible than the earlier described mechanism.

SUMMARY OF THE INVENTION

Viewed from a first aspect, the present invention provides a data processing apparatus for performing transactions, comprising: initiator circuitry for initiating said transactions; recipient circuitry for handling each transaction initiated by the initiator circuitry; a communication path interconnecting the initiator circuitry and the recipient circuitry via which the transactions are propagated between the initiator circuitry and the recipient circuitry; measurement circuitry coupled to said communication path for measuring a value of a predetermined property of the transactions propagated over said communication path; the measurement circuitry comprising: active transaction count circuitry for determining from transaction information passing over the communication path an indication of the number of transactions in progress; accumulator circuitry for maintaining an accumulator value, the accumulator circuitry increasing the accumulator value dependent on said indication of the number of transactions in progress; and a value register for maintaining an estimate of the value of said predetermined property, each time a transaction in progress reaches a predetermined point, the accumulator circuitry being arranged to decrease the accumulator value dependent on said estimate currently stored in the value register, and the value register being arranged to update the estimate stored in the value register dependent on the current accumulator value.

In accordance with the present invention, measurement circuitry its able to monitor the number of transactions in progress over the communication link, and maintain an accumulator value which is increased dependent on the number of transactions in progress. Further, an estimate of the value of the predetermined property to be measured is maintained in a value register, and each time a transaction in progress reaches a predetermined point, the accumulator value is decreased dependent on the estimate currently stored in the value register. Further, the estimate stored in the value register is updated dependent on the current accumulator value.

The exact timing of the decrease of the accumulator value and the update of the estimate stored in the value register can be varied dependent on implementation. However, in one embodiment, both updates occur simultaneously, such that the value of the accumulator value just prior to the decrease being performed is used to perform the update of the estimate, and the value of the estimate just prior to the update is used to decrease the accumulator value.

The present invention thus provides a feedback mechanism, whereby an estimate of the value of the predetermined property to be measured is used to decrease the accumulator value each time the transaction reaches a predetermined point, and further that estimate is itself updated dependent on the accumulator value. By use of this mechanism, it has been found that the estimate stored in the value register quickly settles to the actual value of the predetermined property of the transaction being measured, at which point the accumulator value reaches a steady state with the increases to the accumulator value made dependent on the number of transactions in progress being offset by the decrease of the accumulator value made dependent on the estimate stored in the value register.

Measurement circuitry used in the present invention hence provides a simple and low cost mechanism for measuring a value of a predetermined property of the transactions propagated over the communication path. Further, the mechanism of the present invention does not require full transaction tracking, and in particular does not need to match the end of a transaction with the start of the corresponding transaction. Instead, all that is required is to keep track of the number of transactions in progress, and be able to detect when a transaction in progress reaches a predetermined point. Provided with this information, the operation of the measurement circuitry causes the estimate in the value register to settle to the actual value of the property being measured, by virtue of the feedback mechanism used.

The frequency with which the accumulator circuitry increases the accumulator value dependent on the indication of the number of transactions in progress may vary dependent on the implementation. However, in one embodiment, for each clock cycle whilst the active transaction count circuitry indicates that there is at least one transaction in progress, the accumulator circuitry is arranged to increase the accumulator value.

The predetermined point of a transaction which cause the accumulator value to be decreased and the estimate stored in the value register to be updated, can take a variety of forms, but in one embodiment the predetermined point is a transaction end point. The transaction end point can be configured in a variety of ways, but in one embodiment will be, for a read transaction, the point at which the first read data of that read transaction is returned to the initiator circuitry, or for a write transaction will be the time when a write response signal is output from the recipient circuitry (alternatively it can be configured such that for a write transaction the transaction end point will be the time when the last write data is output from the initiator circuitry).

In such embodiments, each time a transaction ends, the accumulator circuitry is arranged to decrease the accumulator value dependent on said estimate currently stored in the value register and to modify the estimate stored in the value register dependent on the current accumulator value.

The way in which the estimate stored in the value register is updated dependent on the accumulator value can take a variety of forms. However, in one embodiment, the data processing apparatus further comprises updated estimate generation circuitry for generating from the accumulator value an update value used to update the estimate stored in the value register each time a transaction in progress reaches said predetermined point.

In one embodiment, the updated estimate generation circuitry is arranged to apply a scaling factor to the accumulator value in order to generate said update value. The scaling factor may be fixed at design time, but in one embodiment is programmable. By varying the value of the scaling factor, it is possible to vary how quickly the estimate stored in the value register will track actual changes in the value of the predetermined property of the transactions. The scaling factor can hence be considered as applying a time constant to smooth out perturbations in the feedback loop, with the amount of smoothing being dependent on the value of the scaling factor.

In one embodiment, the scaling factor is a fractional value, and said updated estimate generation circuitry is arranged to multiply the accumulator value by said scaling factor in order to generate said update value. In such embodiments, the higher the scaling factor value, the more quickly the estimate stored in the value register will change dependent on changes in the actual value being measured, and accordingly the selection of a relatively high fractional value for the scaling factor will be useful in situations where it is desired to observe detail in changes to the value of the predetermined property being measured. Conversely, if a relatively low value of scaling factor is chosen, the estimate stored in the value register will change more slowly in response to changes in the actual value being measured, and accordingly the value maintained in the value register will provide a better indication of an average value of the predetermined property over a period of time. Accordingly, by providing a scaling factor which is programmable, it is possible to adjust the scaling factor having regard to the form of measurement which it is desired to take.

The predetermined property whose value is measured by the measurement circuitry can take a variety of forms. However, in one embodiment, the predetermined property is an average latency per transaction. By virtue of the way in which the measurement circuitry operates, and in particular the feedback loop incorporating the accumulator circuitry and the value register, the estimate stored in the value register will quickly settle to a value indicative of the average latency per transaction, at which point the output from the accumulator circuitry will also stabilise. Thereafter, the estimate stored in the value register will merely track changes in the average latency per transaction, with the sensitivity of such tracking being dependent on the scaling factor used.

In one embodiment, the transaction information used by the active transaction count circuitry to determine the indication of the number of transactions in progress comprises first and second timing indications for each transaction. The first and second timing indications can take a variety of forms, but in one embodiment said first timing indication is a transaction start indication, and said second timing indication is a transaction end indication. Whilst the conditions triggering the first and second timing indications may be fixed, in one embodiment they can be programmable.

In one embodiment, the estimate maintained by said value register is an estimate of the value of an average latency per transaction, and each clock cycle whilst the active transaction count circuitry indicates that there is at least one transaction in progress, the accumulator circuitry is arranged to increase the accumulator value by an amount corresponding to the number of transactions that are in progress as indicated by the active transaction count circuitry. Further, each time said predetermined point is detected, the accumulator circuitry is arranged to decrease the accumulator value by an amount corresponding to said estimate maintained by said value register. Such an approach enables the average latency per transaction to be tracked, with the estimate stored in the value register quickly settling to a value indicative of the average latency per transaction.

In an alternative embodiment, the estimate maintained by said value register is an estimate of the value of an average interval between occurrences of said predetermined point, and each clock cycle whilst the active transaction count circuitry indicates that there is at least one transaction in progress, the accumulator circuitry is arranged to increase the accumulator value by a fixed integer amount. Further, each time said predetermined point is detected, the accumulator circuitry is arranged to decrease the accumulator value by an amount corresponding to said estimate maintained by said value register. In such an embodiment, it is possible to measure the processing rate instead of the latency, since the interval between occurrences of the predetermined point (which in one embodiment is a transaction end point) provides an effective measure of the processing rate being observed over the corresponding communication path.

The initiator circuitry and recipient circuitry can take a variety of forms. In one embodiment, said initiator circuitry comprises a master device and said recipient circuitry comprises a slave device connected to said master device via said communication path. In such an embodiment, the communication path directly connects a master device to a slave device.

However, more generally, the initiator circuitry may comprise a master interface and the recipient circuitry may comprise a slave interface connected to the master interface via the communication path. In one such embodiment, at least one of the master interface and the slave interface is provided by interconnect circuit connecting one or more master devices with one or more slave devices. Indeed, in some embodiments, both the master interface and the slave interface may be provided by the interconnect circuitry.

The operation of the measurement circuitry of embodiments of the present invention is independent of the transaction protocol used over the communication path. In one embodiment, the transaction protocol allows transactions to be overlapped on the communication path such that multiple transactions are in progress at the same time. Typically each transaction comprises an address transfer from the initiator circuitry to the recipient circuitry and one or more data transfers between the initiator circuitry and the recipient circuitry.

In one embodiment, the communication path employs a split transaction protocol providing at least one address channel over which said address transfer is passed and at least one separate data channel over which said data transfers are passed. In one particular example embodiment, the split transaction protocol is the AXI (Advanced eXtensible Interface) transaction protocol developed by ARM Limited, Cambridge, United Kingdom, the AXI protocol providing separate read address and write address channels and separate read data and write data channels, along with a further separate write response channel.

The measurement circuitry of embodiments of the present invention may be replicated throughout a data processing system to provide multiple separate points of measurement. This hence allows the value of the predetermined property to measured at various locations within the data processing system, which can be useful in a variety of situations, for example when undertaking performance profiling. Additionally, at any particular point where measurements are being taken, separate instances of the measurement circuitry may be provided for read transactions and for write transactions. Accordingly, in such embodiments, a first instance of the measurement circuitry can be coupled to the communication path for measuring a value of the predetermined property of read transactions propagated over the communication path, and a second instance of the measurement circuitry may be coupled to the communication path for measuring a value of the predetermined property of write transactions propagated over the communication path. Typically, the property being measured can vary significantly for read and write transactions, and accordingly it is often useful to be able to independently measure the value of that property for read transactions and for write transactions.

Viewed from a second aspect, the present invention provides a method of measuring a value of a predetermined property of transactions within a data processing apparatus comprising initiator circuitry for initiating said transactions, recipient circuitry for handling each transaction initiated by the initiator circuitry, and a communication path interconnecting the initiator circuitry and the recipient circuitry via which the transactions are propagated between the initiator circuitry and the recipient circuitry, the method comprising the steps of: determining from transaction information passing over the communication path an indication of the number of transactions in progress; maintaining an accumulator value; increasing the accumulator value dependent on said indication of the number of transactions in progress; maintaining in a value register an estimate of the value of said predetermined property; each time a transaction in progress reaches a predetermined point, decreasing the accumulator value dependent on said estimate currently stored in the value register, and updating the estimate stored in the value register dependent on the current accumulator value.

Viewed from a third aspect, the present invention provides a data processing apparatus for performing transactions, comprising: initiator means for initiating said transactions; recipient means for handling each transaction initiated by the initiator means; communication path means for interconnecting the initiator means and the recipient means via which the transactions are propagated between the initiator means and the recipient means; measurement means for coupling to said communication path means and for measuring a value of a predetermined property of the transactions propagated over said communication path means; the measurement means comprising: active transaction count means for determining from transaction information passing over the communication path means an indication of the number of transactions in progress; accumulator means for maintaining an accumulator value, the accumulator means for increasing the accumulator value dependent on said indication of the number of transactions in progress; and a value register means for maintaining an estimate of the value of said predetermined property; each time a transaction in progress reaches a predetermined point, the accumulator means for decreasing the accumulator value dependent on said estimate currently stored in the value register means, and the value register means for updating the estimate stored in the value register dependent on the current accumulator value.

Viewed from a fourth aspect, the present invention provides measurement circuitry for use in a data processing apparatus that performs transactions, the data processing apparatus having initiator circuitry for initiating said transactions, recipient circuitry for handling each transaction initiated by the initiator circuitry, and a communication path interconnecting the initiator circuitry and the recipient circuitry via which the transactions are propagated between the initiator circuitry and the recipient circuitry, the measurement circuitry being arranged to be coupled to said communication path for measuring a value of a predetermined property of the transactions propagated over said communication path, and comprising: active transaction count circuitry for determining from transaction information passing over the communication path an indication of the number of transactions in progress; accumulator circuitry for maintaining an accumulator value, the accumulator circuitry increasing the accumulator value dependent on said indication of the number of transactions in progress; and a value register for maintaining an estimate of the value of said predetermined property, each time a transaction in progress reaches a predetermined point, the accumulator circuitry being arranged to decrease the accumulator value dependent on said estimate currently stored in the value register, and the value register being arranged to update the estimate stored in the value register dependent on the current accumulator value.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
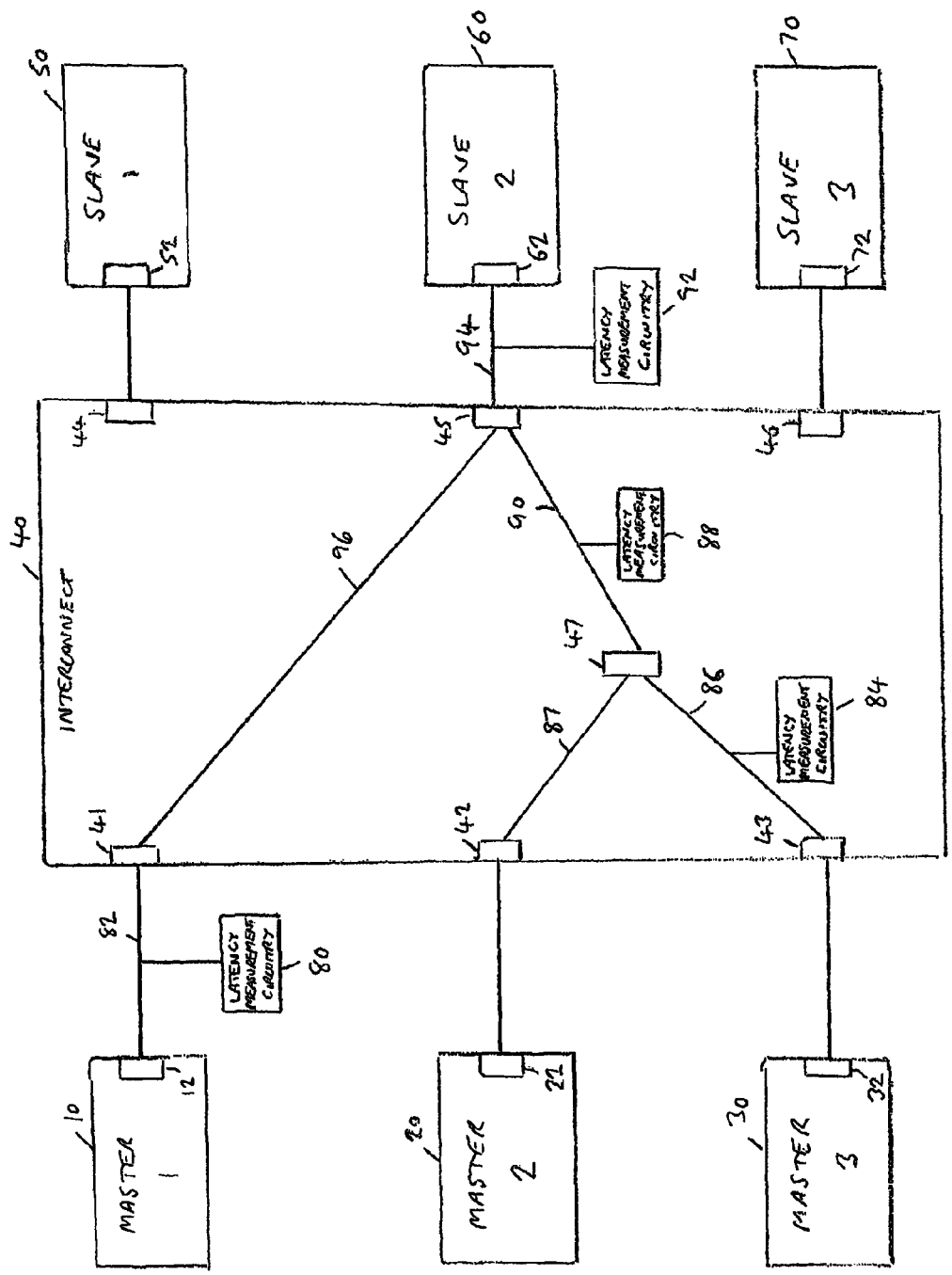
FIG. 1 is a block diagram of a data processing system incorporating latency measurement circuitry in accordance with an embodiment.

FIG. 1 is a block diagram of a data processing system in accordance with one embodiment. In the illustrated example, a plurality of master devices 10, 20, 30 are coupled to a plurality of slave devices 50, 60, 70 via an interconnect structure 40. Typically, each master 10, 20, 30 has a corresponding interface 12, 22, 32 for connecting with an associated interface 41, 42, 43, respectively, provided by the interconnect 40, and similarly each slave device 50, 60, 70 has a corresponding interface 52, 62, 72 for connecting with an associated interface 44, 45, 46 provided by the interconnect 40. As shown schematically in FIG. 1, the interconnect 40 provides a matrix of communication paths via which the master devices 10, 20, 30 and slave devices 50, 60, 70 can be interconnected, and whilst a single communication path may be provided within the interconnect for connecting a particular master to a particular slave (as is for example illustrated schematically for the communication path 96 spanning between the interfaces 41 and 45 to enable master 1 10 to be connected to slave 2 60), more typically there will be multiple communication paths within the interconnect between a particular master and a particular slave, each communication path separated by an interface (such as illustrated schematically by the interface 47 separating the communication path 86 and the communication path 87 from the communication path 90).

Communications between the master devices and the slave devices take place via transactions, a transaction being initiated by a master device and being serviced by a slave device. Each transaction will typically consist of an address transfer from the master device to the slave device, along with one or more data transfers in either direction between the master device and the slave device. For a write transaction, the data transfer(s) will also pass from the master to the slave device, whilst for a read transaction the data transfer(s) will pass from the slave device to the master device.

Each of the interfaces 12, 22, 32, 41, 42, 43, 44, 45, 46, 47, 52, 62, 72 shown in FIG. 1 will operate for each transfer as either a master interface or a slave interface, depending on the direction of that transfer. Indeed it is often the case that the communication paths provide separate channels of communication for the various transfers, and in such embodiments each of the interfaces shown in FIG. 1 can be considered to comprise multiple separate interfaces for those various separate channels of communication. Thus, purely by way of illustration, if we consider an address transfer passing from the master device 1 10 to the slave device 2 60, then the interface 12 will act as a master interface for the communication path 82 and the interface 41 will act as a slave interface. For the communication path 96, the interface 41 acts as the master interface and the interface 45 acts as the slave interface, similarly, for the communication path 94, the interface 45 acts the master interface and the interface 62 acts as a slave interface. Write data transfers also pass in the same direction as the address transfer, and the interfaces operate in the same way. However, assuming a read transaction is being performed, then there will be one or more data transfers from the slave device 2 60 to the master device 1 10, and for those transfers the function of the interfaces changes. Hence, for the communication path 94, the interface 62 now acts as a master interface for the data transfer and the interface 45 acts as a slave interface, for the communication path 96 the interface 45 acts as a master interface and the interface 41 acts as a slave interface, and for the communication path 82 the interface 41 acts as a master interface and the interface 12 acts as a slave interface.

Irrespective of whether the transaction is a read transaction or a write transaction, the address transfer will always pass in a direction from the master to the slave, and hence when considering any particular communication path, the communication path can be viewed as having initiator circuitry (for initiating transactions) at one end and recipient circuitry (for handling transactions) at another end. For any of these communication paths, it can be useful to be able to measure a value of a predetermined property of transactions propagated across those communication paths. For the purposes of the following discussion it will be assumed that the predetermined property to be measured is the latency, but the techniques of the present invention are not limited to the measurement of latency, and any other suitable property of the transactions may be measured.

Accordingly, as shown in FIG. 1, latency measurement circuits in accordance with embodiments of the present invention can be connected to one or more of the communication paths within the data processing system. Purely by way of illustration, FIG. 1 shows latency measurement circuit 80 connected to the communication path 82 extending between the master device 10 and interconnect 40, and latency measurement circuit 92 connected to the communication path 94 extending between the interconnect 40 and the slave device 60. However, as also shown in FIG. 1, such latency measurement circuits can also be connected to internal communication paths within the interconnect, and hence by way of example the latency measurement circuit 84 is connected to the communication path 86 and the latency measurement circuit 88 is connected to the communication path 90. As will be discussed in more detail later, each of these latency measurement circuits can be constructed in the same manner, and provide a simple and effective technique for measuring latency observed on the corresponding communication path.

Figure 2A:
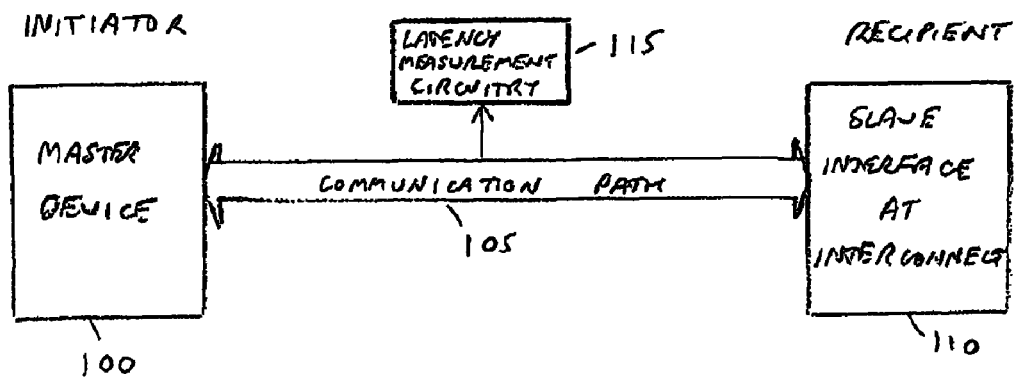
FIGS. 2A to 2C illustrate different communication paths to which the latency measurement circuitry of embodiments may be connected.
Figure 2B:
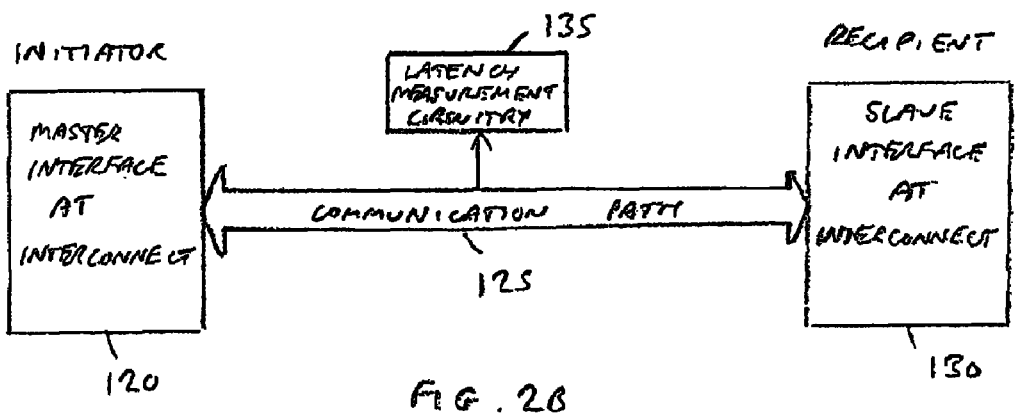
Figure 2C:
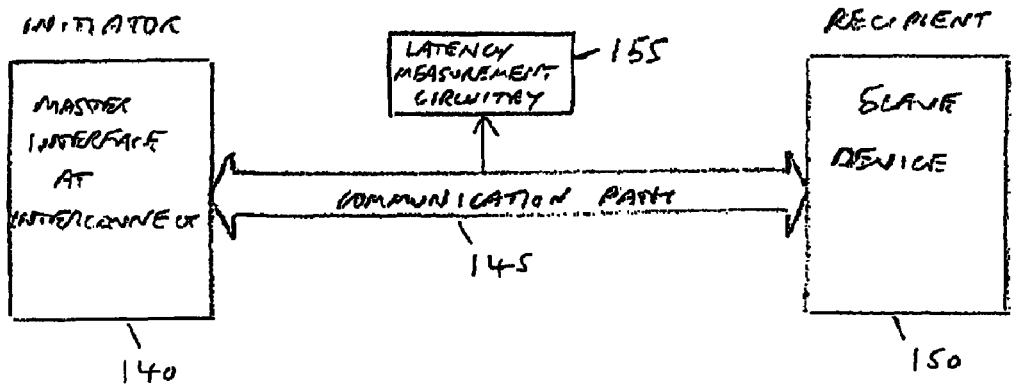

FIG. 2A to 2C illustrate some example configurations where the latency measurement circuitry may be used. As shown in FIG. 2A, a master device 100 is connected to a slave interface at the interconnect 110 via the communication path 105 and latency measurement circuitry 115 is connected to that communication path for measuring the latency of transactions occurring over that communication path. Here, the master device 100 is treated as the initiator circuitry and the slave interface 110 is treated as the recipient circuitry.

FIG. 2B illustrates an alternative example where a master interface at the interconnect 120 is connected to a slave interface at the interconnect 130 via a communication path 125, with the latency measurement circuitry 135 being connected to that communication path. Here the master interface 120 forms the initiator and the slave interface 130 forms the recipient.

Finally, as shown in FIG. 2C, a master interface at the interconnect 140 may be connected to a slave device 150 via the communication path 145, with latency measurement circuitry 155 being connected to that communication path to measure the latency of transactions occurring over that communication path. Here the master interface 140 forms the initiator and the slave device 150 forms the recipient.

Figure 3A:
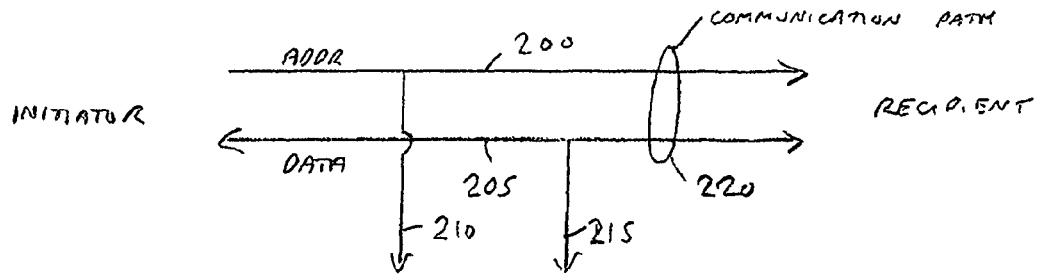
FIGS. 3A and 3B schematically illustrates different forms of communication path to which the latency measurement circuitry of embodiments may be connected.

The communication path can actually be constructed in a variety of ways. In the example of FIG. 3A, the communication path 220 has an address path 200 passing from the initiator to the recipient along with a bi-directional data path 205 passing between the initiator and the recipient. The latency measurement circuitry of embodiments of the present invention can be arranged to monitor the address transfers occurring over the address path 200 via the signal line 210 and also monitor the data transfers occurring over the data path 205 via the signal line 215, with the information obtained via the signal lines 210 and 215 being used to determine the number of transactions in progress over the communication path 220 at any particular point in time. How this information is used by the latency measurement circuitry of embodiments will be discussed later with reference to FIG. 4.

Figure 3B:
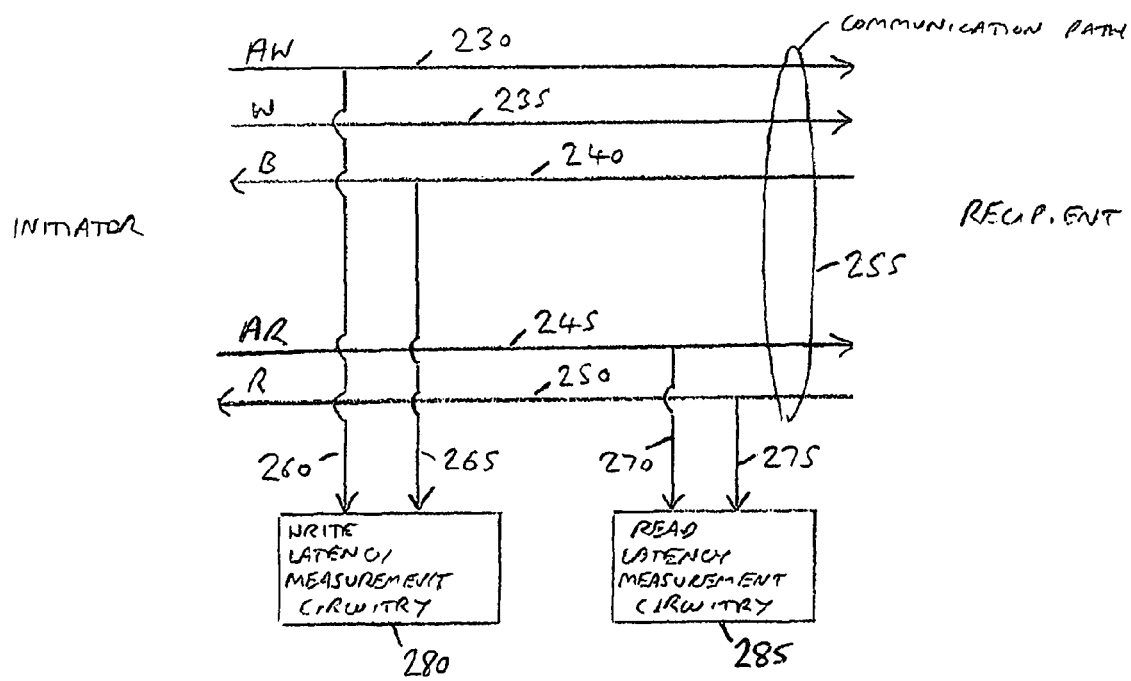

FIG. 3B illustrates an alternative form of communication path 255, employing a multi-channel split transaction protocol. In particular, FIG. 3B illustrates the five separate channels of communication provided by the AXI transaction protocol developed by ARM Limited. As shown, a write address (AW) channel 230 is provided for carrying address transfers of write transactions, a write data (W) channel 235 is provided for carrying data transfers of write transactions, a write response (B) channel 240 is provided for returning transaction status information to the initiator at the end of a write transaction (such transaction status information indicating, for example, whether the transaction completed successfully, or whether an error occurred, etc), a read address (AR) channel 245 is provided for carrying address transfers of read transactions, and a read data (R) channel 250 is provided for carrying data transfers of read transactions.

FIG. 3B shows an example where separate latency measurements are provided for write transactions and for read transactions, the write latency measurement circuitry 280 being connected via paths 260, 265 to the write address channel 230 and the write response channel 240 in order to identify the number of write transactions in progress, whilst the read latency measurement circuitry 285 being connected via paths 270, 275 to the read address and read data channels 245, 250 to enable it to determine the number of read transactions in progress. Whilst in FIG. 3B the write latency measurement circuitry 280 is connected to the write response channel 240, it can in an alternative embodiment be connected to the write data channel 235 and determine the end of write transactions with reference to the write data being transferred over the write data channel 235.

It will be appreciated that separate write and read latency measurement circuits may also be provided for the configuration of FIG. 3A, with control bits passing over the communication path 220 being used to distinguish write transactions from read transactions.

Figure 4:
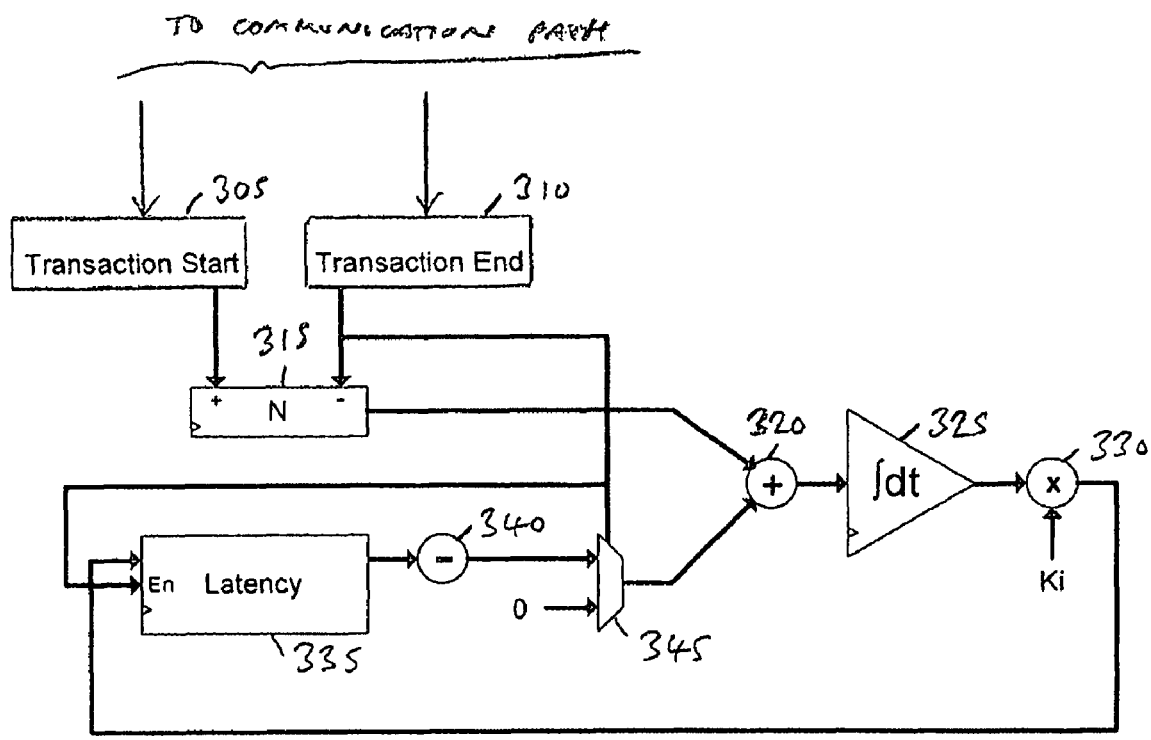
FIG. 4 is a diagram illustrating the components provided within the measurement circuitry in accordance with one embodiment.

FIG. 4 is a diagram schematically illustrating the components provided within the latency measurement circuitry in accordance with one embodiment. The latency measurement circuitry is arranged to snoop the activities occurring over the communication path that it is coupled to, in order to obtain transaction information that is passing over the communication path and from that transaction information determine an indication of the number of transactions in progress. In particular, the transaction start circuitry 305 detects the start of a transaction when a request is issued by the initiator circuitry connected to the communication path (typically the request taking the form of an address transfer), whilst the transaction end circuitry 310 detects the completion of a transaction. In one embodiment, for a read transaction, the transaction end circuitry 310 detects the transaction end when the first read data is returned to the initiator circuitry, whilst for a write transaction the transaction end circuitry 310 may detect the transaction end when the write response signal is issued from the recipient circuitry (or alternatively may detect the transaction end when the last write data item is transferred from the initiator circuitry).

The active transaction count component 315 uses these two events to calculate the number of transactions that are in progress over the communication path. In one embodiment, the active transaction count component 315 can be formed as a simple counter which is incremented following every detection of a transaction start by the transaction start circuitry 305, and is decremented following every detection of a transaction end by the transaction end circuitry 310.

On every clock cycle, the indication of the number of transactions in progress as maintained by the active transaction count component 315 is routed via the adder 320 to the accumulator circuitry 325, which may be formed as an integrator. Within the accumulator circuitry, a number equal to the number of outstanding transactions is then added to the current accumulator value. Accordingly, it can be seen that the accumulator circuitry accumulates the total number of cycles of latency for all outstanding transactions.

A latency value register 335 holds a current estimate of the average latency per transaction. When a transaction end event is detected by the transaction end circuitry 310, the latency value register is enabled to output its currently stored estimate, which is then negated by the element 340 and routed via the multiplexer 345 to the adder circuit 320, thereby causing the current estimated latency value to be subtracted from the accumulator value maintained by the accumulator circuitry 325.

In the absence of a transaction end indication, the multiplexer 345 is merely driven, to selects its zero input as its output, and accordingly produces a zero input to adder 320.

If the estimate held in the latency value register 335 is correct, then the accumulated latency maintained by the accumulator circuitry 325 would remain correct over time, returning to zero when there are no outstanding transactions. If however it is incorrect, then the accumulator value would increase by an amount corresponding to the actual latency minus the estimated latency. Over time the output of the accumulator circuitry will be dominated by this error term.

In accordance with the embodiment illustrated in FIG. 4, a proportion of the output from the accumulator circuitry 325 is fed back as a new estimate for the transaction latency. In particular, the multiplier 330 multiplies the accumulator output by a scaling factor Ki, Ki defining the feedback proportion. This causes the accumulator circuitry 325 to track changes in transaction latency centred around a value 1/Ki times the transaction latency. This results in the latency register 335 quickly settling to a value corresponding to the average latency per transaction.

Since the feedback uses a fraction of the accumulator circuit's output, the estimated latency is actually averaged over a number of transactions. This averaging can be viewed as analogous to a low-pass filter with a time constant related to the proportion (Ki) that is fed back.

The approach described in FIG. 4 has been found to provide a simple and low cost mechanism for measuring the average latency of the transactions propagated over the communication path. The circuitry required is relatively small, consumes low power, and can be configured in the same manner irrespective of where the measurement circuitry is placed within the data processing system. Furthermore, the mechanism is very flexible, since, provided the active transaction count component 315 continues to be enabled, the remainder of the circuitry can be turned on and off as and when desired without affecting correct operation.

The value of the scaling factor Ki can be fixed, but in one embodiment is arranged to be programmable. By enabling the value of Ki to be programmed, the sensitivity of the feedback loop can be varied having regards to the type of measurement to be taken. For example, if a relatively low value of scaling factor is chosen, the estimate stored in the latency register 335 will change more slowly in response to changes in the actual value of the latency being measured, and accordingly will provide a good indication of the average latency per transaction. Alternatively, by choosing a relatively high value for the scaling factor, then the estimate stored in the latency register will change more quickly with changes in the actual latency value being measured, which may be useful in situations where it is desired to observe detail in the changes of the latency value.

Figure 5:
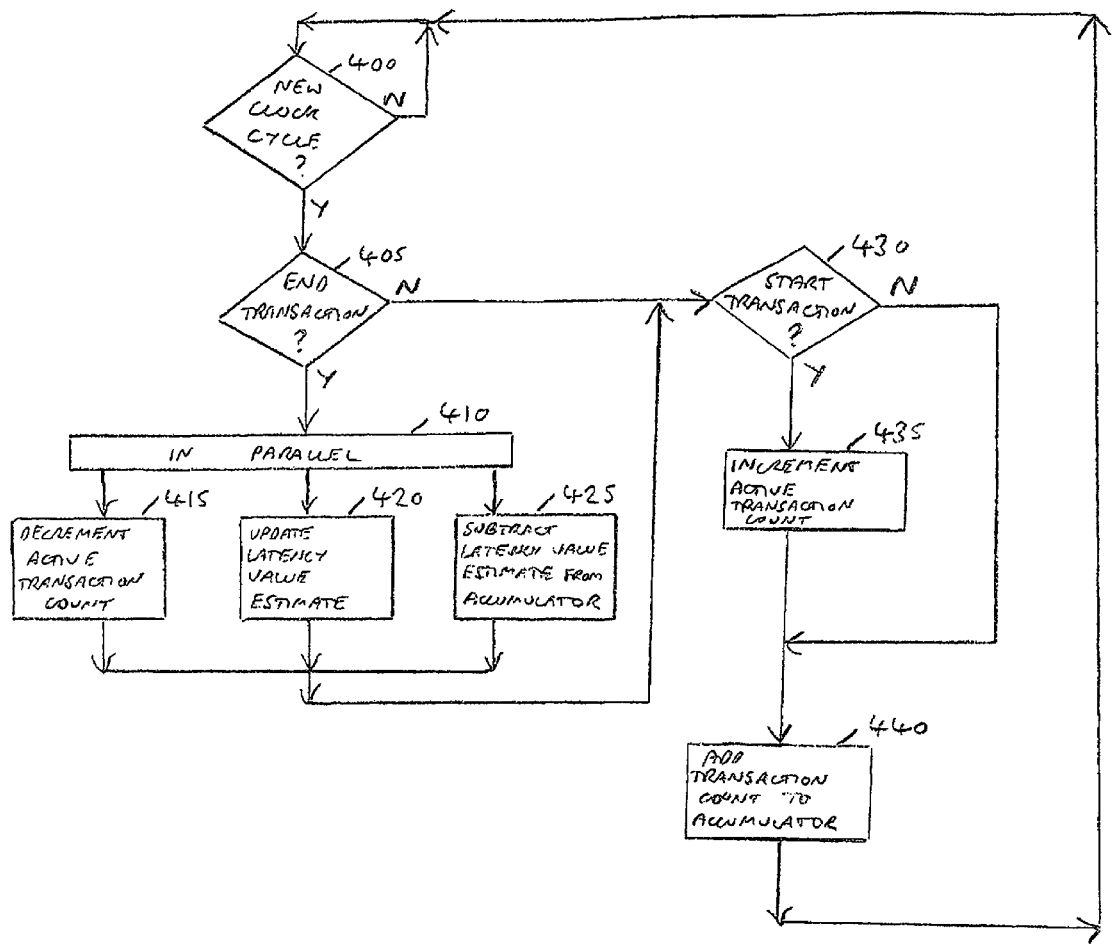
FIG. 5 is a flow diagram illustrating the operation of the measurement circuitry of FIG. 4 in accordance with one embodiment.

FIG. 5 is a flow diagram illustrating the operation of the latency measurement circuit of FIG. 4 in accordance with one embodiment. At step 400, it is determined whether a new clock cycle has started, and when a new clock cycle has started, the process proceeds to step 405, where it is determined whether an end transaction indication has been observed for this clock cycle. If so, then (as indicated by box 410) steps 415, 420 and 425 are performed in parallel. In particular, at step 415 the active transaction count maintained by the component 315 is decremented, typically the value being decremented by 1. At step 420, the latency value estimate maintained in the latency register 335 is updated based on the output of the multiplier 330. Further, at step 425, the current estimate held in the latency register 335 is subtracted from the accumulator value maintained by the accumulator 325.

Following steps 415, 420 and 425, the process proceeds to step 430, or proceeds directly to step 430 from step 405 in the event that an end transaction indication is not observed in the current clock cycle. At step 430, it is determined whether a start transaction indication has been observed in the current clock cycle, and if so the process proceeds to step 435, where the active transaction count value is incremented, typically the value being incremented by 1.

Following step 435, or directly following step 430 in the event that a start transaction indication has not been observed in the current clock cycle, the process proceeds to step 440 where the current transaction count value is added to the accumulator in order to increase the accumulator value by a number equal to the number of outstanding transactions. Following step 440, the process returns to step 400 and awaits the start of the next clock cycle.

Figure 6:
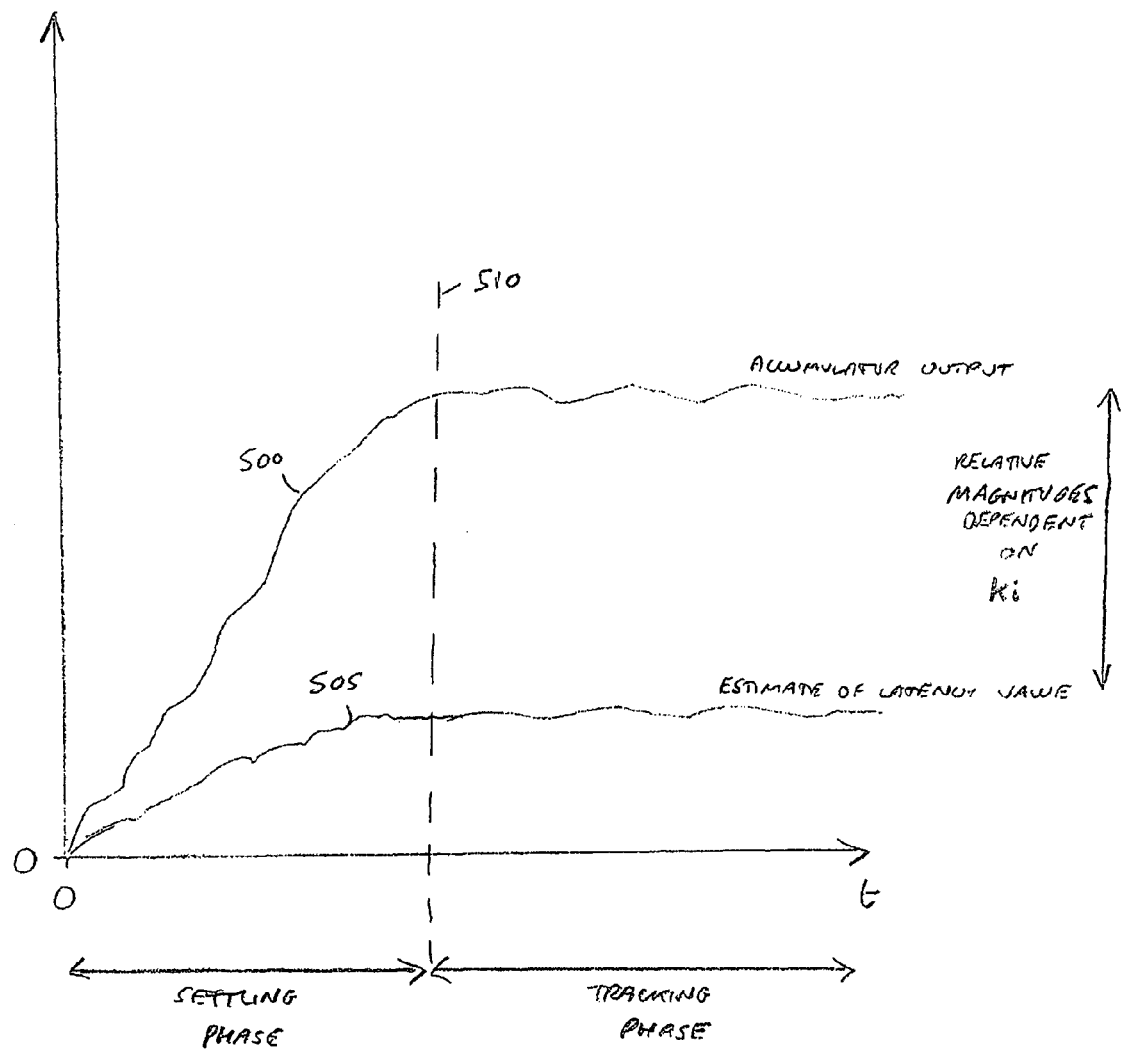
FIG. 6 is a graph illustrating how the output of the accumulator and latency value register of the measurement circuitry of FIG. 4 settle during operation.

FIG. 6 is a graph illustrating how the accumulator output from integrator 325 and the estimate held in the latency register 335 vary following the turning on of the latency measurement circuit. In the example illustrated, it is assumed that the accumulator output and the value stored in the latency register 335 are both reset to zero at the start of the operation. As shown in FIG. 6, during a settling phase, the accumulator value produced by the accumulator circuitry 325 starts to rise as indicated by the line 500, since during each clock cycle the accumulator value is incremented by the number of pending transactions maintained by the element 315. Initially the value stored in the latency register 335 is zero, and hence when the first transaction end is observed, nothing is subtracted from the accumulator value. However, at the same time, the value in the latency register is updated based on the current accumulator value, and accordingly it will be appreciated that over time the value stored in the latency register 335 increases, as indicated schematically by the line 505. Accordingly, over time, the amount subtracted from the accumulator value following each transaction end being observed will increase, and at a certain point will reach a value which accurately reflects the average latency per transaction being observed over that communication path. At this point the process enters a tracking phase where the accumulator output remains relatively stable, and the value stored in the latency register 335 provides an accurate indication of the average latency per transaction being observed at that time. As the real latency being observed over the communication path varies during this period, the value stored in the latency register 335 will merely track those variations, this being represented by the minor variations in the accumulator output and the estimate of latency value as shown in FIG. 6 during the tracking phase. The relative magnitudes of the accumulator output and the latency estimate stored in the register 335 will be dependent on the value of the scaling factor Ki chosen.

From the above description, it will be appreciated that the described embodiment of latency measurement circuitry provides a relatively small and low power mechanism for reliably measuring the latency of transactions observed over a communication path. The measurement circuitry is very flexible, in that, provided the active transaction count component 315 continues to be enabled, the rest of the measurement circuitry can be enabled and disabled at any time and, irrespective of when that circuitry is enabled, will over a short period of time cause a latency estimate to be stored within the latency register 335 which accurately tracks the real latency being observed over the communication path. Further, the same configuration of circuitry can be used in a variety of different systems, and for a variety of different communication paths within each system.

The technique of the present invention is not limited to the measurement of latency, but indeed values of other predetermined properties of transactions can also be measured. For example, if instead of increasing the accumulator value each cycle by a value dependent on the number of transactions in progress, the accumulator value is instead incremented by a fixed amount each cycle whilst there are any pending transactions in progress, the value stored in the register 335 will not provide a measure of latency, but instead will quickly settle to a value indicative of the average interval in occurrences of the transaction end points. The value provided within the register 335 will hence give an indication of the processing rate being observed over the corresponding communication path.

Although a particular embodiment of the invention has been described herein, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. A data processing apparatus for performing transactions, comprising:
    initiator circuitry configured to initiate said transactions;
    recipient circuitry configured to handle each transaction initiated by the initiator circuitry;
    a communication path configured to interconnect the initiator circuitry and the recipient circuitry via which the transactions are propagated between the initiator circuitry and the recipient circuitry; and
    measurement circuitry, coupled to said communication path, configured to measure a value of predetermined property of the transactions propagated over said communication path, said measurement circuitry comprising:
        active transaction count circuitry configured to determine, from transaction information passing over the communication path, an indication of the number of transactions in progress;
        accumulator circuitry configured to maintain an accumulator value, the accumulator circuitry increasing the accumulator value dependent on said indication of the number of transactions in progress from said active transaction count circuitry; and
        a value register configured to maintain an estimate of the value of said predetermined property, wherein, the accumulator circuitry is further configured to decrease the accumulator value dependent on said estimate currently stored in the value register, and the value register is further configured to update the estimate stored in the value register dependent on the current accumulator value such that said decrease in the accumulator value and said update of said estimate are performed each time a transaction in progress reaches a predetermined point.

2. A data processing apparatus as claimed in claim 1, wherein, for each clock cycle whilst the active transaction count circuitry indicates that there is at least one transaction in progress, the accumulator circuitry is arranged to increase the accumulator value.

3. A data processing apparatus as claimed in claim 1, wherein said predetermined point is a transaction end point, such that each time a transaction ends, the accumulator circuitry is arranged to decrease the accumulator value dependent on said estimate currently stored in the value register and to modify the estimate stored in the value register dependent on the current accumulator value.

4. A data processing apparatus as claimed in claim 1, further comprising updated estimate generation circuitry configured to generate from the accumulator value an update value used to update the estimate stored in the value register each time a transaction in progress reaches said predetermined point.

5. A data processing apparatus as claimed in claim 4, wherein said updated estimate generation circuitry is configured to apply a scaling factor to the accumulator value in order to generate said update value.

6. A data processing apparatus as claimed in claim 5, wherein said scaling factor is a fractional value, and said updated estimate generation circuitry is configured to multiply the accumulator value by said scaling factor in order to generate said update value.

7. A data processing apparatus as claimed in claim 5, wherein said scaling factor is programmable.

8. A data processing apparatus as claimed in claim 1, wherein said predetermined property whose value is measured by the measurement circuitry is an average latency per transaction.

9. A data processing apparatus as claimed in claim 8, wherein the transaction information used by the active transaction count circuitry to determine the indication of the number of transactions in progress comprises first and second timing indications for each transaction.

10. A data processing apparatus as claimed in claim 9, wherein said first timing indication is a transaction start indication, and said second timing indication is a transaction end indication.

11. A data processing apparatus as claimed in claim 1, wherein:
the estimate maintained by said value register is an estimate of the value of an average latency per transaction;
each clock cycle whilst the active transaction count circuitry indicates that there is at least one transaction in progress, the accumulator circuitry is arranged to increase the accumulator value by an amount corresponding to the number of transactions that are in progress as indicated by the active transaction count circuitry; and
each time said predetermined point is detected, the accumulator circuitry is arranged to decrease the accumulator value by an amount corresponding to said estimate maintained by said value register.

12. A data processing apparatus as claimed in claim 1, wherein:
the estimate maintained by said value register is an estimate of the value of an average interval between occurrences of said predetermined point;
each clock cycle whilst the active transaction count circuitry indicates that there is at least one transaction in progress, the accumulator circuitry is arranged to increase the accumulator value by a fixed integer amount; and
each time said predetermined point is detected, the accumulator circuitry is arranged to decrease the accumulator value by an amount corresponding to said estimate maintained by said value register.

13. A data processing apparatus as claimed in claim 1, wherein said initiator circuitry comprises a master device and said recipient circuitry comprises a slave device connected to said master device via said communication path.

14. A data processing apparatus as claimed in claim 1, wherein said initiator circuitry comprises a master interface and said recipient circuitry comprises a slave interface connected to said master interface via said communication path.

15. A data processing apparatus as claimed in claim 14, wherein at least one of the master interface and the slave interface is provided by interconnect circuitry connecting one or more master devices with one or more slave devices.

16. A data processing apparatus as claimed in claim 15, wherein both the master interface and the slave interface are provided by said interconnect circuitry.

17. A data processing apparatus as claimed in claim 1, wherein transactions are overlapped on said communication path such that multiple transactions are in progress at the same time.

18. A data processing apparatus as claimed in claim 1, wherein each transaction comprises an address transfer from the initiator circuitry to the recipient circuitry and one or more data transfers between the initiator circuitry and the recipient circuitry.

19. A data processing apparatus as claimed in claim 18, wherein the communication path employs a split transaction protocol providing at least one address channel over which said address transfer is passed and at least one separate data channel over which said data transfers are passed.

20. A data processing apparatus as claimed in claim 1, wherein at least two instances of said measurement circuitry are provided, a first instance of the measurement circuitry being coupled to said communication path for measuring a value of said predetermined property of read transactions propagated over said communication path, and a second instance of the measurement circuitry being coupled to said communication path for measuring a value of said predetermined property of write transactions propagated over said communication path.

21. A method of measuring a value of a predetermined property of transactions within a data processing apparatus comprising initiator circuitry for initiating said transactions, recipient circuitry for handling each transaction initiated by the initiator circuitry, and a communication path interconnecting the initiator circuitry and the recipient circuitry via which the transactions are propagated between the initiator circuitry and the recipient circuitry, the method comprising the steps of:
determining from transaction information passing over the communication path an indication of the number of transactions in progress;
maintaining an accumulator value;
increasing the accumulator value dependent on said indication of the number of transactions in progress from said determining step;
maintaining in a value register an estimate of the value of said predetermined property;
each time a transaction in progress reaches a predetermined point, decreasing the accumulator value dependent on said estimate currently stored in the value register, and updating the estimate stored in the value register dependent on the current accumulator value.

22. A data processing apparatus for performing transactions, comprising:
initiator means for initiating said transactions;
recipient means for handling each transaction initiated by the initiator means;
communication path means for interconnecting the initiator means and the recipient means via which the transactions are propagated between the initiator means and the recipient means;
measurement means for coupling to said communication path means and for measuring a value of a predetermined property of the transactions propagated over said communication path means;
the measurement means comprising:
active transaction count means for determining from transaction information passing over the communication path means an indication of the number of transactions in progress;
accumulator means for maintaining an accumulator value, the accumulator means for increasing the accumulator value dependent on said indication of the number of transactions in progress from said active transaction count means; and
a value register means for maintaining an estimate of the value of said predetermined property, wherein, the accumulator means decreases the accumulator value dependent on said estimate currently stored in the value register means, and the value register means updates the estimate stored in the value register dependent on the current accumulator value such that said decrease in the accumulator value and said update of said estimate are performed each time a transaction in progress reaches a predetermined point.

23. Measurement circuitry for use in a data processing apparatus that performs transactions, the data processing apparatus having initiator circuitry for initiating said transactions, recipient circuitry for handling each transaction initiated by the initiator circuitry, and a communication path interconnecting the initiator circuitry and the recipient circuitry via which the transactions are propagated between the initiator circuitry and the recipient circuitry, the measurement circuitry being arranged to be coupled to said communication path for measuring a value of a predetermined property of the transactions propagated over said communication path, and comprising:

active transaction count circuitry configured to determine from transaction information passing over the communication path an indication of the number of transactions in progress;

accumulator circuitry configured to maintain an accumulator value, the accumulator circuitry increasing the accumulator value dependent on said indication of the number of transactions in progress; and a value register configured to maintain an estimate of the value of said predetermined property, wherein, the accumulator circuitry is configured to decrease the accumulator value dependent on said estimate currently stored in the value register, and the value register is configured to update the estimate stored in the value register dependent on the current accumulator value such that said decrease in the accumulator value and said update of said estimate are performed each time a transaction in progress reaches a predetermined point.

24. A data processing apparatus for performing transactions, comprising:

initiator circuitry for initiating said transactions;

recipient circuitry for handling each transaction initiated by the initiator circuitry;

a communication path interconnecting the initiator circuitry and the recipient circuitry via which the transactions are propagated between the initiator circuitry and the recipient circuitry; and measurement circuitry coupled to said communication path for measuring a value of a predetermined property of the transactions propagated over said communication path, said measurement circuitry comprising:

active transaction count circuitry for determining from transaction information passing over the communication path an indication of the number of transactions in progress;

accumulator circuitry for maintaining an accumulator value, the accumulator circuitry increasing the accumulator value dependent on said indication of the number of transactions in progress; and a value register for maintaining an estimate of the value of said predetermined property, each time a transaction in progress reaches a predetermined point, the accumulator circuitry being arranged to decrease the accumulator value dependent on said estimate currently stored in the value register, and the value register being arranged to update the estimate stored in the value register dependent on the current accumulator value, wherein each transaction comprises an address transfer from the initiator circuitry to the recipient circuitry and one or more data transfers between the initiator circuitry and the recipient circuitry, wherein the communication path employs a split transaction protocol providing at least one address channel over which said address transfer is passed and at least one separate data channel over which said data transfers are passed.

25. A data processing apparatus for performing transactions, comprising:

initiator circuitry for initiating said transactions;

recipient circuitry for handling each transaction initiated by the initiator circuitry;

a communication path interconnecting the initiator circuitry and the recipient circuitry via which the transactions are propagated between the initiator circuitry and the recipient circuitry; and measurement circuitry coupled to said communication path for measuring a value of a predetermined property of the transactions propagated over said communication path, said measurement circuitry comprising:

active transaction count circuitry for determining from transaction information passing over the communication path an indication of the number of transactions in progress;

accumulator circuitry for maintaining an accumulator value, the accumulator circuitry increasing the accumulator value dependent on said indication of the number of transactions in progress; and a value register for maintaining an estimate of the value of said predetermined property, each time a transaction in progress reaches a predetermined point, the accumulator circuitry being arranged to decrease the accumulator value dependent on said estimate currently stored in the value register, and the value register being arranged to update the estimate stored in the value register dependent on the current accumulator value, wherein at least two instances of said measurement circuitry are provided, a first instance of the measurement circuitry being coupled to said communication path for measuring a value of said predetermined property of read transactions propagated over said communication path, and a second instance of the measurement circuitry being coupled to said communication path for measuring a value of said predetermined property of write transactions propagated over said communication path.

* * * * *